United States Patent
Bhattacharya et al.

(10) Patent No.: US 12,141,781 B2
(45) Date of Patent: Nov. 12, 2024

(54) SYSTEM AND METHOD FOR ADDITIONAL SECURITY IN A VEHICLE BASED TRANSACTION

(71) Applicant: VISA INTERNATIONAL SERVICE ASSOCIATION, San Francisco, CA (US)

(72) Inventors: Som Madhab Bhattacharya, Bangalore (IN); Surendra Vyas, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/109,485

(22) Filed: Feb. 14, 2023

(65) Prior Publication Data
US 2023/0186274 A1 Jun. 15, 2023

Related U.S. Application Data

(62) Division of application No. 16/640,314, filed as application No. PCT/US2017/050101 on Sep. 5, 2017, now Pat. No. 11,599,869.

(51) Int. Cl.
| | |
|---|---|
| G06Q 20/32 | (2012.01) |
| G06F 21/44 | (2013.01) |
| G06K 7/14 | (2006.01) |
| G06Q 20/36 | (2012.01) |
| G06Q 20/40 | (2012.01) |
| G06Q 40/02 | (2023.01) |
| H04L 9/32 | (2006.01) |

(52) U.S. Cl.
CPC ........... *G06Q 20/326* (2020.05); *G06F 21/44* (2013.01); *G06K 7/1417* (2013.01); *G06Q 20/3226* (2013.01); *G06Q 20/3672* (2013.01); *G06Q 40/02* (2013.01); *H04L 9/3213* (2013.01); *G06Q 20/4016* (2013.01); *G06Q 2220/00* (2013.01)

(58) Field of Classification Search
CPC ............ G06Q 20/326; G06Q 20/3226; G06Q 20/3672; G06Q 40/02; G06Q 20/4016; G06Q 2220/00; G06Q 20/40; G06F 21/44; G06K 7/1417; H04L 9/3213
USPC .......................................................... 705/66
See application file for complete search history.

(56) References Cited

U.S. PATENT DOCUMENTS

| | | | |
|---|---|---|---|
| 4,458,535 A | 7/1984 | Juergens | |
| 11,068,136 B1 * | 7/2021 | Koushik | ............... G06F 3/0482 |
| 11,599,869 B2 | 3/2023 | Bhattacharya | |
| 2012/0160912 A1 | 6/2012 | Laracey | |
| 2014/0279477 A1 * | 9/2014 | Sheets | ................ G06Q 20/3278 |
| | | | 705/41 |
| 2015/0058224 A1 | 2/2015 | Gaddam | |
| 2015/0356560 A1 | 12/2015 | Shastry | |

(Continued)

OTHER PUBLICATIONS

Office Action (First action interview—office action) dated Mar. 25, 2022 for U.S. Appl. No. 16/640,314 (pp. 1-4).

(Continued)

*Primary Examiner* — Zeshan Qayyum
(74) *Attorney, Agent, or Firm* — K&L Gates LLP

(57) ABSTRACT

Identification elements may be added to a vehicle and the identification elements may be required before a transaction through the vehicle may be approved. The identification elements may be a second layer of security to ensure that a payment request is valid and not fraudulent.

12 Claims, 7 Drawing Sheets

(56) References Cited

U.S. PATENT DOCUMENTS

| | | |
|---|---|---|
| 2016/0078434 A1 | 3/2016 | Huxham |
| 2017/0076279 A1* | 3/2017 | Pebbles |
| 2017/0249635 A1* | 8/2017 | Baur .................. G06Q 20/3278 |
| 2017/0323505 A1* | 11/2017 | Gaddam .................. H04L 63/08 |
| 2018/0018657 A1* | 1/2018 | Sawant .................. G06Q 20/36 |
| 2020/0258076 A1 | 8/2020 | Bhattacharya |

OTHER PUBLICATIONS

Office Action (Notice of Allowance and Fees Due (PTOL-85)) dated Nov. 1, 2022 for U.S. Appl. No. 16/640,314 (pp. 1-8).
Office Action (Preinterview first office action) dated Feb. 2, 2022 for U.S. Appl. No. 16/640,314 (pp. 1-4).

* cited by examiner

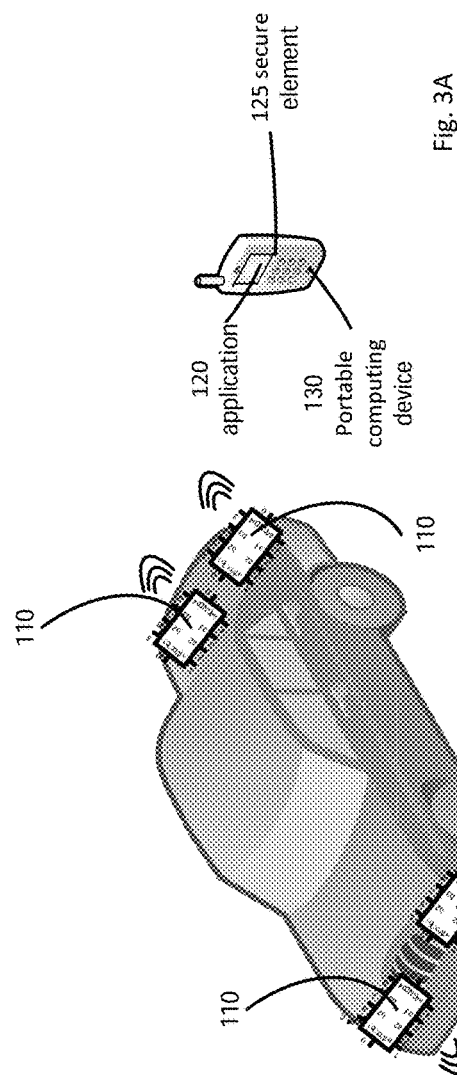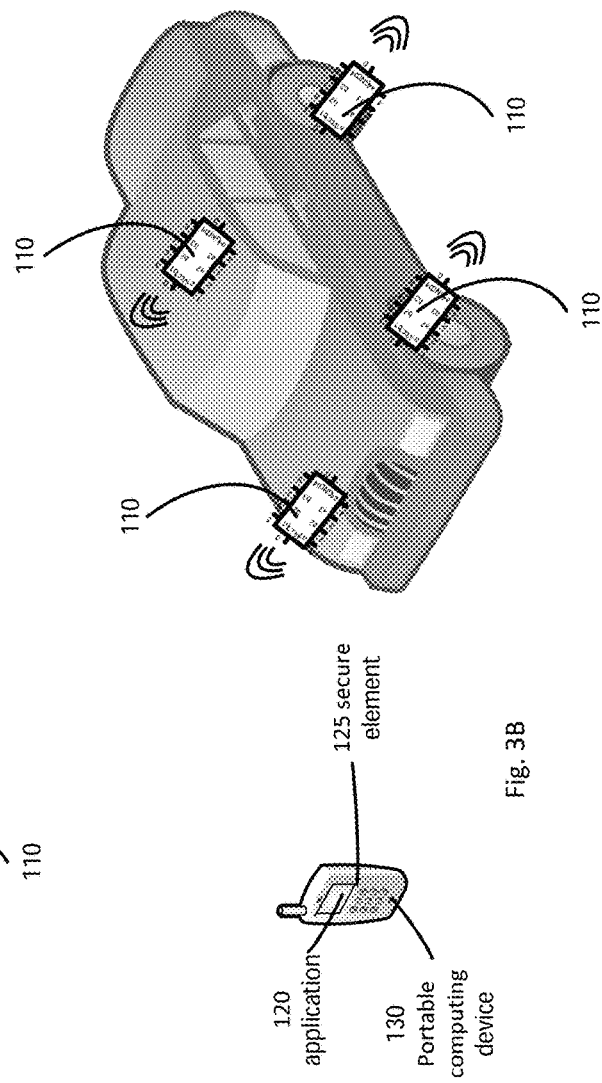

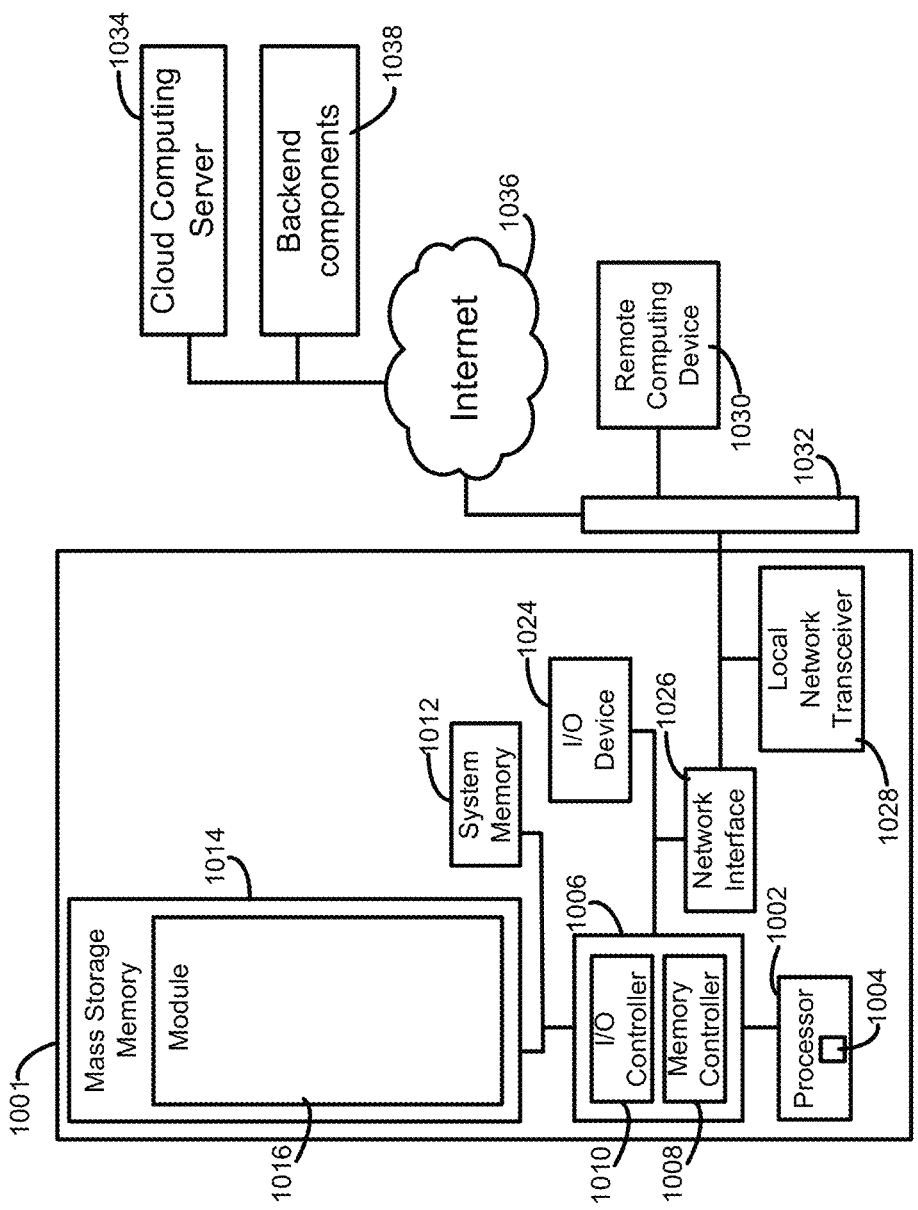

SYSTEM AND METHOD FOR ADDITIONAL SECURITY IN A VEHICLE BASED TRANSACTION

CROSS-REFERENCE TO RELATED APPLICATIONS

This application is a divisional application of U.S. application Ser. No. 16/640,314, filed on Feb. 19, 2020, which is a national phase of and claims priority to International Application No. PCT/US17/50101, filed Sep. 5, 2017, the disclosures of which are incorporated by reference herein in their entirety.

BACKGROUND

As computing devices have become more mobile, so have mobile payments. User can use a payment device such as a credit card or a payment while in a vehicle such as a car. However, trying to verify that a payment device is not being used fraudulently in a moving vehicle may be a challenge as the user may be obscured or the transaction may be undertaken in high speed.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

At a high level, the system 100 may address the technical problem of making transactions more secure. In addition, the system may address the technical problem of adding payment capabilities to a vehicle that was made at a time when vehicle payments were not contemplated. By adding identification elements to a vehicle, payments may be enabled and may be more secure than previously possible. Identification elements 110 may be added to a vehicle and the identification elements 110 may be required before a transaction through the vehicle 105 may be approved. The identification elements 110 may be a second layer of security to ensure that a payment request is valid and not fraudulent. In some embodiments, the identification elements 110 may be passive and may be read by identification readers and in other embodiments, the identification elements 110 may be active and may communication identification signal.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 3a is an illustration of a vehicle with identification elements being part of the light bulbs in the vehicle and communicating with a portable computing device;
FIG. 3b is an illustration of a vehicle with identification elements being part of the tires in the vehicle and communicating with a portable computing device;
FIG. 5 may be a sample computing system used by the system.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to theft corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

At a high level, the system 100 may address the technical problem of making transactions more secure. In addition, the system may address the technical problem of adding payment capabilities to a vehicle that was made at a time when vehicle payments were not contemplated. By adding identification elements to a vehicle, or to parts of a vehicle, payments may be enabled and may be more secure than previously possible. Retailers may be able to sell additional physical vehicle equipment that has a vehicle related function and has a trusted payment function. Related, consumers may be able to purchase additional physical vehicle equipment that has a vehicle related function and has a trusted payment function.

Figure 1A:
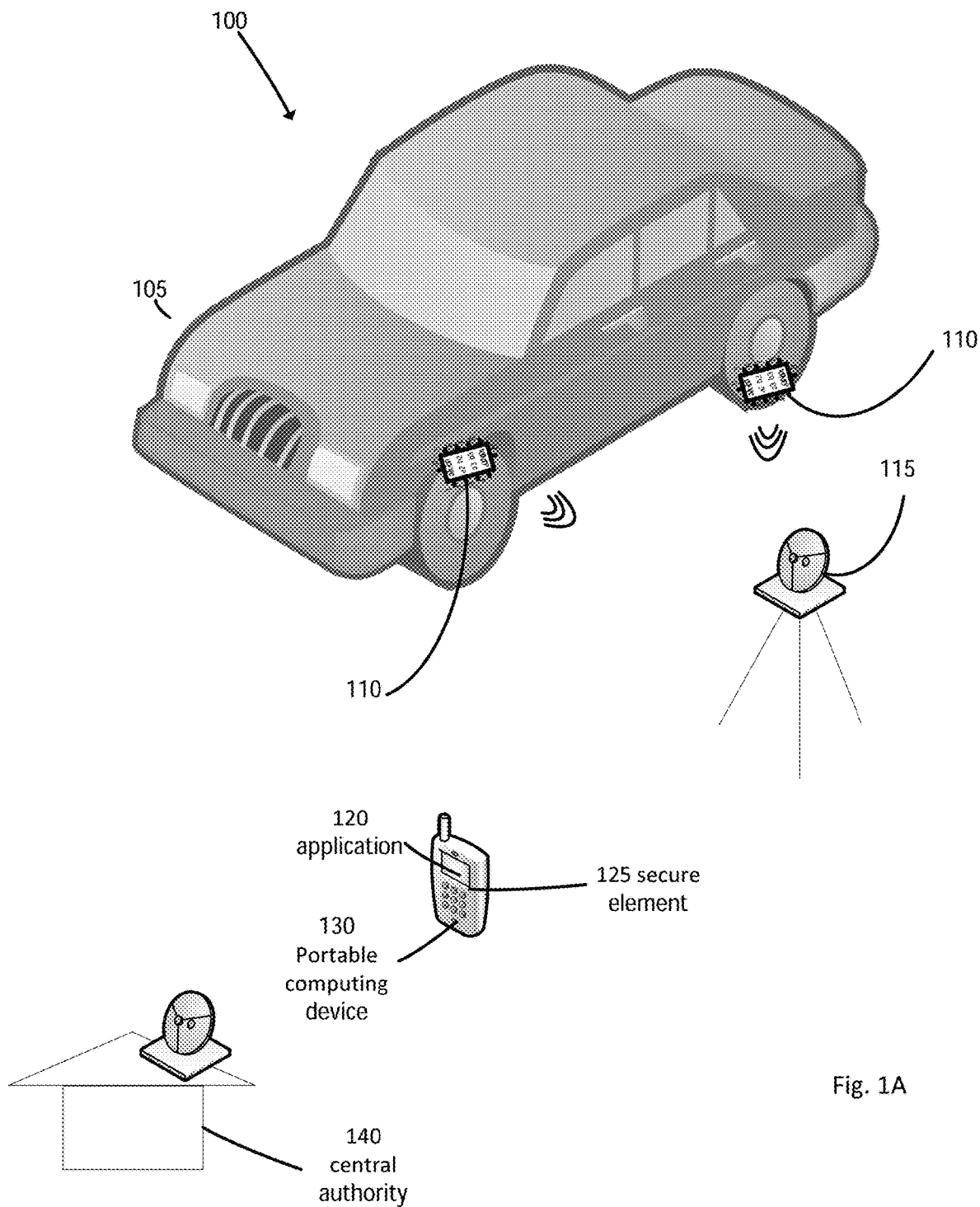
FIG. 1a is a vehicle used in the system.
Figure 1B:
FIG. 1b is a vehicle used in the system.

FIG. 1 may illustrate a sample system 100 for assisting in a transaction. A vehicle 105 may be part a payment system. The vehicle 105 could be a car, a boat, a bicycle, a bus, an airplane or any other mode of transportation. At a high level, identification elements 110 may be added to a vehicle and the identification elements 110 may be required before a transaction through the vehicle 105 may be approved. The identification elements 110 may be a second layer of security to ensure that a payment request is valid and not fraudulent. In some embodiments, the identification elements 110 may be passive and may be read by identification readers and in other embodiments, the identification elements 110 may be active and may communication identification signal.

The identification element 110 may take on a variety of forms. In some embodiments, the identification element 110 may be an element that can be sensed. As an example, a visible bar element, OR element or serial of characters may be read by an identification sensor 115 to provide the identification element 110. In another embodiment, the identification element 110 may be an RF signal based device which may provide a signal when in range of a power source.

In other embodiments, the identification element 110 may be more sophisticated. The identification element 110 may include a processor, an input/output circuit, a memory and a power source as illustrated in FIG. 5. The power source may be wired into the vehicle electrical system or may be a battery based system or may be a system which recharges itself based on the motion of the vehicle. In addition, remote sources of power may be used when the vehicle is in proximity such as induction sources or other RF sources of power.

In some embodiments, there may be a plurality of identification elements 110. Each of the identification elements 110 may register with an application 120, a secure element 125 in a computing device 130 or with the central authority 140 as registered identification elements 110. In one embodiment, all the registered identification elements 110 may need to be present and sensed by the identification sensor 115 for a transaction to be approved or verified. In another embodiment where the identification element 110 is more sophisticated, a plurality of identification elements 110 may communicate with each other through wireless means such as Wi-Fi, Bluetooth, BLE, etc., and may form a network. If one identification element 110 from the network is missing, the transaction may not be approved.

Figure 2A:
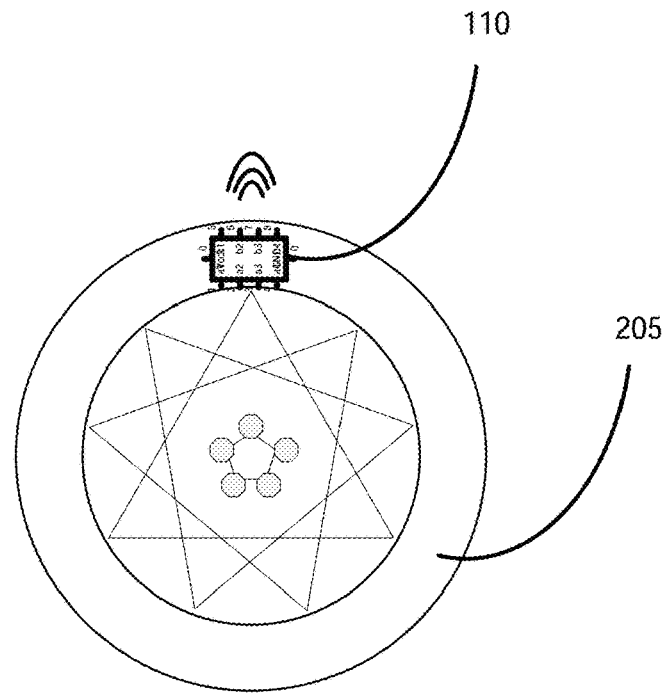
FIG. 2a is tire with an identification element used in the system.
Figure 2B:
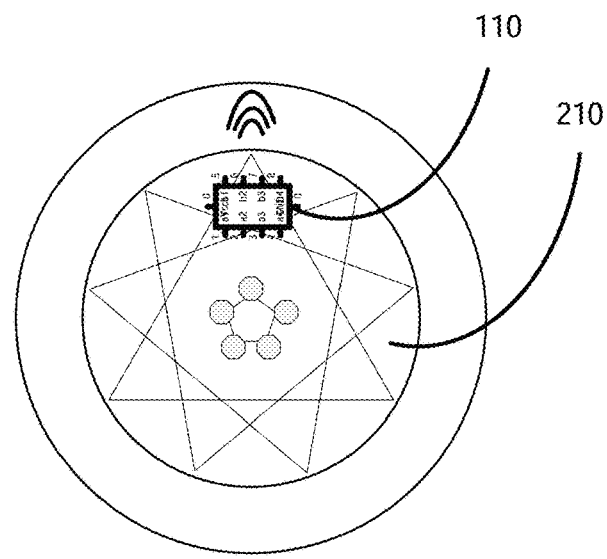
FIG. 2b is wheel with an identification element used in the system.
Figure 2C:
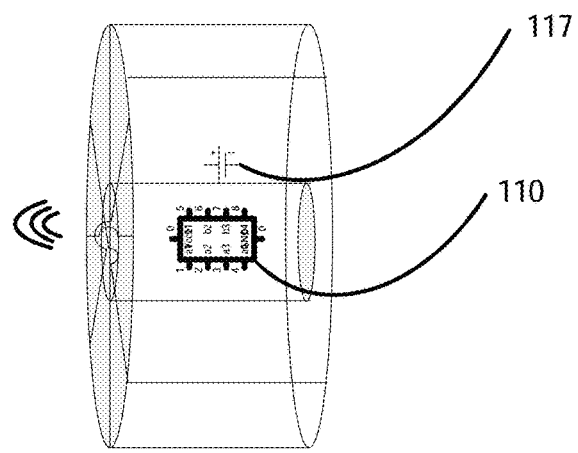
FIG. 2c is a wheel with an identification element.

The identification element 110 may be placed on the vehicle 105 in a variety of locations. In one embodiment, the identification element 110 may be in or on a tire 205 (FIG. 2a) or a wheel 210 (FIG. 2b). In the embodiments where the identification element is powered, an electrical supply would be required. However, many modern tires have pressure sensors that require power and batteries or a central power source may be adapted to provide power to the identification element. For example, in FIG. 2c, the identification element 110 may be placed inside a tire on a wheel and power 117 may be from a central source or may be from a battery or from a regenerative source that uses the rotation of the wheel to generate electricity which may be used to power the identification element 110.

Figure 2D:
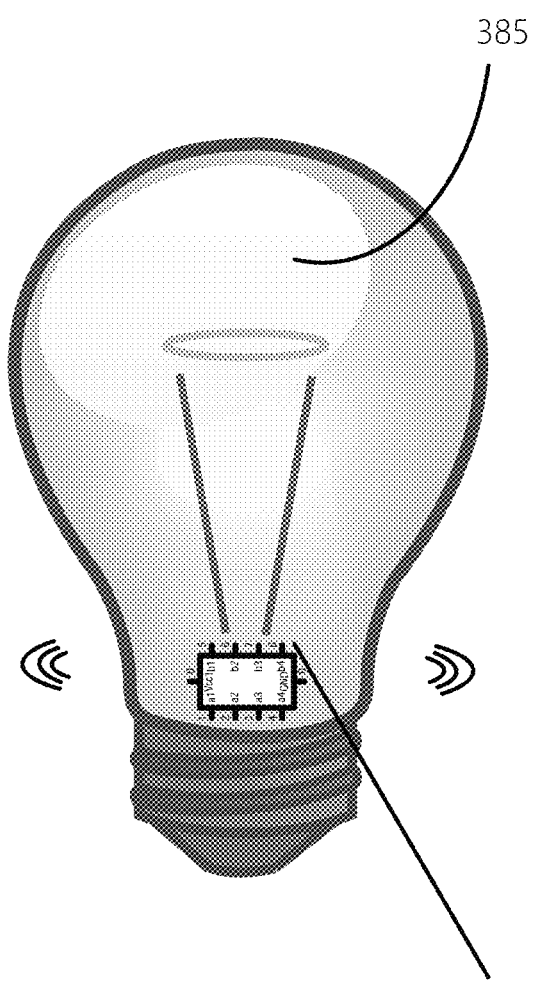
FIG. 2d is lightbulb with an identification element used in the system.

In another embodiment, the identification element may be in a light bulb, providing easy access to electricity as illustrated in FIG. 2d. If the vehicle is a boat as in FIG. 1B, the identification element 110 may be on a buoy or on the side of the boat 105 as illustrated in FIG. 2. As the identification element 110 may be added to an existing vehicle 105 and the application and secure element 125 may reside on a portable computing device 130, the payment system may be added to virtually any vehicle 105. For example, a vehicle 105 with no computing devices that is purely mechanical such as a classic car 105 may now be able to be fitted with tires with identification elements 110 and along with a secure element 125, the classic car 105 may be able to make payments like a modern car.

In some embodiments, the identification element 110 may communicate with other identification elements 110 to form a network of identification elements 110 such as illustrated in FIGS. 3a and 3b. FIG. 3a may be an illustration of a vehicle 105 with identification elements 110 being part of the light bulbs 385 in the vehicle 105 and communicating with a portable computing device 130 and FIG. 3b may be an illustration of a vehicle 105 with identification elements 110 being part of the tires in the vehicle 105 and communicating with a portable computing device 130. By having the identification element 110 communicate with each other, additional security may be achieved as all four tires or a given number of light bulbs 385 (or a combination of tires and light bulbs 385) may be needed for the application 120 to be confident that the vehicle 105 is authorized to make purchases. For example, if a thief steals one tire with an identification element 110, that one tire may not be sufficient to enable a purchase as all four tires may be needed to complete a network registration and have a purchase from the vehicle 105 be authorized.

When the various identification elements 110 are added to a vehicle, an initialization procedure may occur where the identification elements 110 may register with the application 120. Once the identifications elements 110 are registered with the application, the application may ensure all identification elements are present before beginning a transaction. In this arrangement, the need to have one or more of the sub-nodes register with the lead node may ensure a single identification element 110 is not stolen and used to make a transaction.

In one embodiment, one identification element 110 may be a lead node and the other identification elements 110 may be sub-nodes. The sub-nodes may register with the lead node and if all the sub-nodes register, the lead node may communicate an approval signal to the application and the secure element that the network is complete and operating as expected. At this point, the application 120 may be confident that the vehicle has all the identification elements 110 and the transaction may proceed. If all sub-nodes do not register, the application 120 may provide a warning to the user that one or more of the identification elements 110 is missing or is operating improperly such that the user may address the problem and/or proceed with the transaction. In other embodiments, the application may simple indicate an error and stop the process.

In other embodiments, the identification elements 110 may register with the application itself. The application may operate on a portable computing device 130 which may communicate with the identification elements 110. The application may track if all the expected identification elements 110 are present and functioning.

In some embodiments, the data of the identification elements 110 may be stored locally in the lead node or in the portable computing device 130. In other embodiments, the data on the identification elements 110 may be stored remotely. If the data is stored remotely, identification elements 110 which are registered to a first user and then appear to a second user may be marked as fraudulent, such as when a tire is stolen and placed on an additional car. In such situations, communications may be made to the first party that a registered identification element 110 has been located elsewhere.

The data on the identification elements may be a serial number or code. The serial number may follow a predetermined format. The data may be shared with the central authority and the central authority may verify the data as being valid. For example, when the identification element 110 is in a tire, the tire may have a tire identification number (TIN). The TINs may be in a range and if a TIN is reported to the central authority and is outside the acceptable range, a transaction may be marked as possibly being fraudulent. Similarly, the data may include a TIN and additional data such as the tire manufacturer and tire manufacture date. The additional details also may be used to further verify the TIN and that the purchase is authorized. For example, Tire Manufacture A may have a range of TINs and if the reported tire manufacture and TIN do not agree, the transaction may be noted as possibly being fraudulent.

The system may also include an identification sensor 115. The identification sensor 115 may also take on a variety of forms in order to complement the identification element 110. For example, in the embodiment where the identification element 110 is a OR code or element, the identification sensor 115 may be a OR reader that is capable of reading OR codes on a moving vehicle 105 from a distance. For example, a camera with sufficient power to zoom in on a OR code and the appropriate decoding software may be the identification sensor 115.

In other embodiments, the identification sensor 115 may provide a power field which may energize the identification element 110 to provide an identification signal. For example, the identification sensor may be an RFID and the identification sensor 115 may provide a power field to energize the RF id to provide a response signal.

The identification sensor 115 may also have wireless communication capabilities to communicate with an identification element 110 that is capable of communicating wireless. As will be further explained, the identification element 110 may have a power source and may be capable of providing a wireless signal periodically or in response to a polling signal from a wireless identification sensor 115. Common wireless manners of communication including Wi-Fi, BLE, Bluetooth and any other appropriate wireless communication methodology may be appropriate.

In addition, the identification sensor 115 may have a plurality of capabilities. For example, a high powered camera may be used to pick up OR elements or bar elements or even serial numbers. In addition, the identification sensor 115 may provide power to energize RFID. Finally, the identification sensor 115 may receive wireless signals from the identification element 110.

As the identification sensor 115 may be meant to be added to a vehicle, if may be embodied in a variety of replaceable parts on a vehicle. For example, the identification sensor may be embedded in a tire in which case a power source, such as a battery or a connection to the vehicle's electrical system may be needed. Another example may be windshield wipers which are easily replaceable but may need a power source. Another embodiment may be in a vehicle light bulb which may already have power source and may be easily replaceable. Other parts of the vehicle may also be logical candidates such as bumper covers, wheels, car speakers, etc. And in some embodiments, the identification sensor 115 may be a stand-alone unit which may be mounted using adhesive or screws to the vehicle 105.

The system may also have a secure element 125. The secure element 125 may be a computing element that takes in data and responds with an electronic dynamic token that represents data and has a limited lifespan. In some embodiments, the secure element 125 may include a processor, an input output circuit, a power source and a memory as illustrated in FIG. 5. The token may be understood by a limited number of receivers of the token as an electronic key may be needed to translate the token into understandable data. For example, in a credit transaction, a token may be understood by a card issuer in order to have the proper accounts debited/credited, but others that are part of the transaction may not be able to understand the token.

The secure element 125 may store identification element 110 data. Additional data may also be stored in a memory such as a unique id for the secure element 125, a leader identification element, details on the registered identification elements, payment module endpoint data and related mobile device endpoint data. In some embodiments, the secure element 125 may have additional processing power and may determine whether all the identification elements 110 are registered identification elements 110 with the secure element 125.

The secure element 125 may be part of the vehicle 105 when it is built. In other embodiments, the secure element 125 may be added to a vehicle 105 as an add-on, similar to a new radio. In yet other embodiments, the secure element 125 may be in a portable computing device 130 such as a smart phone such that the system may work with virtually any vehicle 105 without regard to the age of the vehicle 105.

An application may 120 assist in the transaction system 100. The application 120 may have a user interface and may take on a variety of tasks in the payment system. For example, it communicate data to the secure element 125. It also may ensure communications proceed as expected in the system 100. It also may encrypt the data in the system.

The user interface may provide feedback to a user on the progress through the payment system 100 and whether a purchase was successful or the reasons, if any, a transaction was denied. The user interface may also the user to set up the application or to add additional elements to the system as will be explained. In addition, the user interface may be designed to reduce errors in inputting the identification codes and payment devices and to make the entire process easy for a user.

The application 120 may also communicate with a central authority 140. The central authority 140 may be a card issuer, a transaction processor or other entity in a transaction system that has a role in authenticating or verifying a purchase. The application 120 may be in communication with the secure element 125 to receive data in a tokenized format. In another embodiment, the application 120 may include an encryption algorithm and may encrypt data to be communicated with the central authority 140.

Figure 4A:
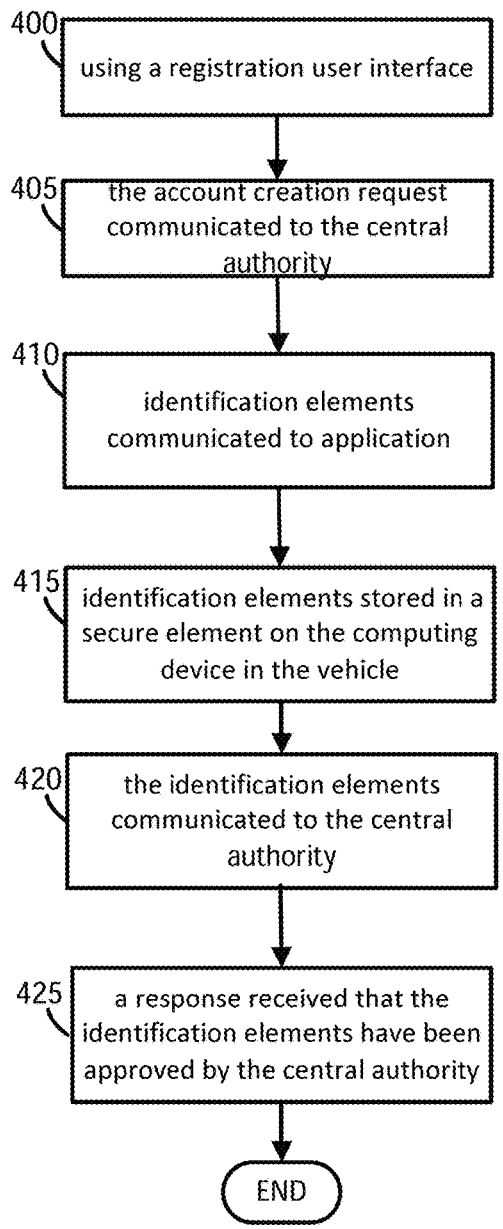
FIG. 4a is a flowchart of beginning use of the system.

Referring to FIG. 4a, the system 100 may begin using a registration user interface in the application 120. The application 120 may be installed on a vehicle 105 or on a computing device 130 with secure element 125. The computing device 130 may be integrated into the vehicle 105 or may be a separate computing device such as a smart phone 130.

Using the application 120, a user interface may be present to create a purchase account. A wizard or step by step guide may be used to guide a user through the creation. In one embodiment, a user may add a payment device such as a credit card to be used as part of the purchase account. In other embodiments, the payment device may be an electronic payment device such as a Visa Checkout or similar online payment systems. In yet another embodiment, an account representing value may be linked to the application such as a checking account, a savings account or an investment account.

Once the payment account is added, at block 405 the account creation request may be communicated to the central authority 140. At the central authority 140, the account creation request may be reviewed for approval. In some embodiment, the payment device may be tested to ensure it has value, is authorized and is set up for future transactions.

The advance identification element 110, identification sensor 115, portable computing device 130 and authority computers 140 may be specifically designed. As an example, the identification sensor 115 may be designed to use low power such that it may operate off a battery for a longer period of time. Similarly, the identification sensor 115 may not require extensive computing power. In contrast, the computing devices in the central authority 140 may require a high number of transactions and may be required to perform a large number of computing tasks in a short period of time. Thus, the computers/servers at the central authority 140 may have greater processing power as power consumption may be less of a concern.

At block 410, in response to the create account request being approved by the central authority 140, identification elements 110 may be communicated to application 120. As mentioned, the identification elements 110 may act as an additional layer of security for a transaction such that a transaction may not occur without the identification elements 110 being sensed by the identification sensors 115 and communicated to the central authority 140. The identification elements 110 may be added by manual typing, by captured by an image processing device such as a camera or wireless receiver on the computing device 130, or may be received from an identification sensor 115. In another aspect, the identification elements 110 may be received in a second channel such as an email or sms message, a social media message, or from an additional web site related to a merchant.

At block 415, in some embodiments, the identification elements 110 may be stored in a secure element 125 on the computing device 130 in the vehicle 105. In other embodiments, the identification elements 110 are communicated to and stored in the central authority 140.

At block 420, the identification elements 110 may be communicated to the central authority 140. In some embodiments, the identification elements 110 may be encrypted before being communicated to the central authority 140. The encryption may be any known encryption technology but the keys may be vehicle specific, Once at the central authority 140, the identification elements 110 may be stored in a memory and associated with the payment account created in block 405.

At block 425, a response may be received that the identification elements 110 have been approved by the central authority 140. The identification elements 110 may be reviewed by the central authority 140, For example, the identification elements 110 may be compared to known identification elements 110 to determine if the identification element 110 have been stolen or are being reused without permission. Similarly, identification element manufacturers may be contacted to ensure the identification elements 110 are valid.

Figure 4B:
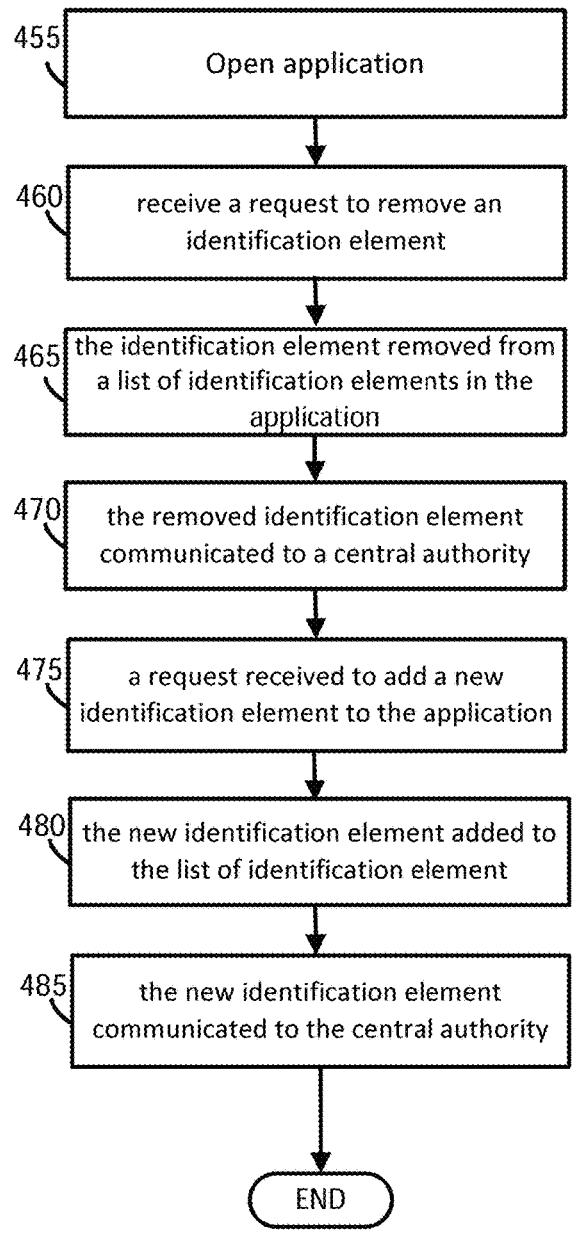
FIG. 4b is a flowchart of adding a new identification element to the system.

Logically, identification element 110 may need to be updated from time to time, FIG. 4b may illustrate a sample method for updating identification elements 110. At block 455, the application 120 which is in communication with a secure element 125 may be opened. The application may 120 include a wizard or step by step process to amend the identification elements 110. At block 460, a request to remove an identification element 110 (flat tire) may be received by the application 120. In some embodiments, the application 120 may sense that an identification element 110 has changed (new tire) and may remind a user to amended the identification elements 110 in the system 100. In other embodiments, the user may initiate the process.

At block 465, in response to the removal request being approved, the identification element 110 may be removed from a list of identification elements 110 in the application 120. The identification element 110 may remain in the memory but may be removed from the list of active identification elements 110. In other embodiments, the identification element 110 may be completely removed from the system 100.

At block 470, the removed identification element 110 may be communicated to a central authority 140. The communication may be encrypted and in some embodiments, the identification element 110 may be in a token. At block 475, a request may be received to add a new identification element 110 to the application 120. For example, if a tire with an identification element 110 may be removed from a vehicle 105 and a new tire may be added. As the new tire may have a new identification element 110, the old identification element 110 may be removed and the new identification element 110 would be added. At block 480, in response to the new identification element 110 being approved, the new identification element 110 may be added to the list of identification elements 110 for a secure element 125 and at block 485, the new identification element 110 may be communicated to the central authority 140.

The communication between the central authority 140 and the application 120 may follow a pre-defined format and may utilize an application programming interface that follows a known format to easy communication between the application 120 and the central authority 140. Further, as the application uses a known API, additional applications may be written to interface with the application 120.

FIG. 5 is a high-level block diagram of an example computing environment 1000 for the system 100 and method 300 for purchasing and returning items in a checkout-free store, as described herein. The computing device 1001 may include a server (e.g., the payment processing server 114, a mobile computing device (e.g., user computing device 106), a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods described herein may be used to implement and execute the example systems of FIG. 1 and methods of FIGS. 4A and 4B. Although the example system 1000 is described below as including a plurality of peripherals, interfaces, chips, memories, etc., one or more of those elements may be omitted from other example processor systems used to implement and execute the example systems and methods. Also, other components may be added.

As shown in FIG. 5, the computing device 1001 includes a processor 1002 that is coupled to an interconnection bus. The processor 1002 includes a register set or register space 1004, which is depicted in FIG. 5 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 10, the computing device 1001 may be a multi-processor device and, thus, may include one or more additional processors that are identical or similar to the processor 1002 and that are communicatively coupled to the interconnection bus.

The processor 1002 of FIG. 5 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, the computing device 1001 may be used to implement a module 1016 (e.g., the various modules as herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001, the system 100, and method 300. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028. (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the components of the system 100, and perform any operations related to the methods as described herein.

The local network transceiver 1028 may include support for a Wi-Fi network, Bluetooth, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 10 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a Java® applet executing within a Java® Virtual Machine (JVM) environment resident in the computing device 1001 or the remote computing device 1030. The module 1016 may also be a "plug-in" adapted to execute in a web-browser located on the computing devices 1001 and 1030. In some embodiments, the module 1016 may communicate with back end components 1038 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 10 to simplify and clarify the description, it is understood that any number of chant computers are supported and can be in communication within the system 1000.

Additionally, certain embodiments are described herein as including logic or a number of components, modules, or mechanisms. Modules may constitute either software modules (e.g., element or instructions embodied on a machine-readable medium or in a transmission signal, wherein the element is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method comprising:
communicating, by a computing device executing an application, a create account request to a central authority server for creating a purchase account;
receiving, by the computing device executing the application, a create account approval from the central authority server;
in response to receiving the create account approval, registering a vehicle for a vehicle-based transaction using the purchase account, wherein registering the vehicle comprises:
transmitting, by identification elements physically coupled to the vehicle, identification elements data to the computing device executing the application;
storing, by the computing device, the identification elements data in a secure element of the computing device;
communicating, by the computing device executing the application, the identification elements data to the central authority server; and
receiving, by the computing device executing the application, a response that the identification elements have been approved by the central authority server for use in the vehicle-based transaction.

2. The method of claim 1, wherein the identification elements data are encrypted.

3. The method of claim 2, wherein the computing device is integrated into the vehicle.

4. The method of claim 1, wherein storing, by the computing device, the identification elements data in the secure element comprises storing in a memory:
a unique ID;
a leader identification element;
details on the identification elements;
payment module endpoint data; and
related mobile device endpoint data.

5. The method of claim 1, wherein the identification elements are in communication with a tire of the vehicle.

6. The method of claim 1, wherein the identification elements each further comprise:
a processor;
an input/output circuit;
a power source; and
a memory.

7. The method of claim 1, wherein the identification elements include a lead identification element and additional identification elements.

8. The method of claim 7, further comprising registering, by the additional identification elements, with the lead identification element.

9. The method of claim 8, further comprising registering, by the lead identification element, with the secure element.

10. The method of claim 8, further comprising determining, by the lead identification element, whether the additional identification elements are expected additional identification elements.

11. A method, comprising:
communicating, by a vehicle computing device executing an application, a create account request to a central authority server, wherein the vehicle computing device is integrated into a vehicle;
receiving, by the vehicle computing device executing the application, a create account approval from the central authority server;
in response to receiving the create account approval, registering the vehicle for a vehicle-based transaction, wherein registering the vehicle comprises:
transmitting by identification elements physically coupled to the vehicle, identification data to the vehicle computing device executing the application;
storing, by the vehicle computing device, the identification data in a secure element of the vehicle computing device;
communicating, by the vehicle computing device executing the application, the identification data to the central authority server; and
receiving, by the vehicle computing device executing the application, a response that the identification elements have been approved by the central authority for use in the vehicle-based transaction.

12. A method, comprising:
communicating, by a computing device executing an application, a create account request to a central authority server;
receiving, by the computing device executing the application, a create account approval from the central authority server;
in response to receiving the create account approval, registering vehicle identification devices physically coupled to a vehicle for use in a vehicle-based transaction, wherein registering the vehicle identification devices comprises:
transmitting by the vehicle identification devices physically coupled to the vehicle, identification data to the computing device executing the application;
storing, by the computing device, the identification data in a secure element of the computing device, and communicating, by the computing device executing the application, the identification data to the central authority server; and
receiving, by the computing device executing the application, a response that the vehicle identification devices have been approved by the central authority for use in the vehicle-based transaction.

* * * * *